(12) United States Patent
Johnston et al.

(10) Patent No.: US 11,329,900 B1
(45) Date of Patent: May 10, 2022

(54) SEQUENCED CAPACITY DEPLOYMENT FOR WAN AND DATACENTER NETWORKS

(71) Applicant: Google LLC, Mountain View, CA (US)

(72) Inventors: Matthew Johnston, Palo Alto, CA (US); Anurag Sharma, Cupertino, CA (US); Robert Nygaard, Fairfax, VA (US); Ray Bennett, Fall Church, VA (US); Robert Withrow, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/316,242

(22) Filed: May 10, 2021

(51) Int. Cl.
- *H04L 12/24* (2006.01)
- *H04L 41/5041* (2022.01)
- *H04L 41/5003* (2022.01)
- *H04L 41/14* (2022.01)
- *H04L 41/12* (2022.01)
- *H04L 41/082* (2022.01)

(52) U.S. Cl.
CPC ........ *H04L 41/5041* (2013.01); *H04L 41/082* (2013.01); *H04L 41/12* (2013.01); *H04L 41/14* (2013.01); *H04L 41/5003* (2013.01)

(58) Field of Classification Search
CPC ....... H04L 41/082; H04L 41/12; H04L 41/14; H04L 41/5003; H04L 41/5041
See application file for complete search history.

(56) References Cited

U.S. PATENT DOCUMENTS

| | | | |
|---|---|---|---|
| 9,172,614 B2 | 10/2015 | Perrett | |
| 2006/0050634 A1* | 3/2006 | Gous | H04L 43/0882 370/229 |
| 2010/0017247 A1* | 1/2010 | Liu | H04W 16/18 705/7.27 |
| 2017/0272317 A1* | 9/2017 | Singla | H04W 12/06 |
| 2019/0342795 A1* | 11/2019 | McFarland | H04W 24/08 |

\* cited by examiner

*Primary Examiner* — Gil H. Lee
(74) *Attorney, Agent, or Firm* — Lerner, David, Littenberg, Krumholz & Mentlik, LLP (57) ABSTRACT

Determining an upgrade path from a starting topology to a target topology of a network is computationally intense and does not guarantee a steadily increasing usable capacity of the network at each stage within the upgrade path. The disclosed technology allows for a sequence of stages related to network upgrades to be generated. The technology ensures that networks can be upgraded in a sequential manner, where each step in the sequence does not violate service level objectives related to the network, ensures operational continuity of the network by users of the network, and ensures that the available network resources increase as the sequential upgrades are rolled out. The pathway determined is determined in a computationally efficient manner.

20 Claims, 7 Drawing Sheets

SEQUENCED CAPACITY DEPLOYMENT FOR WAN AND DATACENTER NETWORKS

BACKGROUND

Datacenter and other networks can span vast geographical regions and include multiple network locations. Networks are typically designed to meet different service level objectives (SLOs). Each network location can comprise a node on the network. Upgrading a network can comprise upgrades to a physical and logical topology of the network as a whole, including network locations.

Upgrades to networks and network infrastructure typically takes place in stages, where a part of the network is modified. The generation of each stage is typically done manually, based on heuristics. This risks the available capacity of the network at each stage and creates inefficiencies in aspects of network upgrades. Typically, the manually generated sequence of stages also does not take into account the desired service level objectives for each stage of the network upgrade.

SUMMARY

Aspects of the disclosed technology can include systems, methods, devices, and computer readable medium containing instructions which can be used to upgrade a method. The method can comprise obtaining a starting topology and a target topology; obtaining a set of data related to performance requirements for the network; calculating, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements or performance constraints for the network specified by the set of data; and determining a usable capacity or other metric for each intermediate topology. The method can output a usable capacity determined for each intermediate topology. The method can simulate each intermediate topology to ensure that the network meets a risk level related to the network. Each intermediate topology can be a logical topology. The method can generate deliverables, tasks, or projects required to achieve each intermediate topology. The deliverables can include a physical topology or a set of changes to a physical topology for each intermediate topology. Each deliverable can comprises a modification to a physical component of the physical topology of the network.

Aspects of the disclosed technology can comprise a system with one or more processing devices coupled to a memory containing instructions, the instructions causing the one or more processing devices to obtain a starting topology and a target topology; obtain a set of data related to performance requirements for the network; calculate, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements for the network specified by the set of data; determine a usable capacity for each intermediate topology; and display or output information associated with the calculated finite sequence. The instructions can cause outputting the usable capacity determined for each intermediate topology. The usable capacity can be a strictly increasing function. Each intermediate topology can be a logical topology. The instructions can cause generating deliverables required to achieve each intermediate topology. The deliverables can include a physical topology or a set of changes to a physical topology for each intermediate topology. Each deliverable can comprises a modification to a physical component of the physical topology of the network.

Aspects of the disclosed technology can include a non-transient computer readable medium containing program instructions, the instructions when executed perform the steps of obtaining a starting topology and a target topology; obtaining a set of data related to performance requirements for the network; calculating, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements for the network specified by the set of data; and determining a usable capacity for each intermediate topology. A usable capacity can be output for each intermediate topology. The usable capacity can be a strictly increasing function. Each intermediate topology can be a logical topology or physical topology, or both. Deliverables required to achieve each intermediate topology can be generated. The deliverables can include a physical topology or a set of changes to a physical topology for each intermediate topology.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Overview

The technology provides techniques and systems that allow for generation of a sequence of stages related to network upgrades. The technology enables a network upgrade to be performed in a sequential manner, where each element or step in the sequence avoids or mitigates against violation of service level objectives related to network performance, enables operational continuity of the network by users of the network, and may provide that available network resources increase as the sequential upgrades are rolled out.

The technology can take as inputs a starting network topology, whether physical or logical, and a final network topology, whether physical or logical, and provide a series of "N" stages, each stage containing a network topology, where the series of the N stages provide an upgrade pathway or sequence from the starting network topology to the final network topology. An aspect of the disclosed technology is determining the pathway or sequence of upgrades starting from the final network topology and inversely processing intermediate topologies to arrive at the starting network topology. Each stage within the series of "N" stages can be associated with a supportable throughput or capacity. The sequence of "N" stages can be such that the useful, supportable, or accessible capacity of the network at each stage is a strictly increasing function even when the total capacity of the network is not strictly increasing or decreasing between two stages. In some examples, the technology can accept as an input a list of demands or list of requirements related to the "N" stages. For example, the list of demands or list of requirements can specify certain performance requirements or characteristics of the network at each stage or multiple stages. For example, the list of demands or requirements can specify certain throughput requirements between two points of the network, the total throughput of the network at a given time or period, or other constraints or requirements for the network.

The technology can generate the series of "N" stages by splitting a global mathematical programming or other related optimization problem into a series of N−1 problems. The technology can start with an arbitrary stage "K" and use information related to that stage to provide information related to stage "K−1." For example, the technology can use the last stage, which can be the target topology of the network upgrade, and use that as an input to generate a topology for the second to last stage. The technology can also consider any additional inputs specific to that topology, such as network demands or requirements, or an arbitrary set of constraints from the network. The process can be repeated iteratively until the starting topology is reached. In this manner, the technology can split the global problem into a series of smaller problems.

The technology can generate a series of "N" stages without searching all possible upgrade paths from a starting topology to a target topology. The technology can split a global optimization problem into smaller optimizations for each stage, working in reverse from the target topology. The selected projects for stage N are used as inputs to stage N−1 to choose a subset of projects. The process can iteratively progress until the starting topology is reached.

For example, the techniques described herein may include a computing device being provided with a target network topology, a starting network topology, and a list of requirements for the network over intermediate stages between the target topology and the starting network topology. As a specific example, the computing device may receive as the target topology addition of a new node in the network and the list of requirements may comprise that the available capacity does not fall below 1 TB per second. The computing device may generate an initial intermediate topology based on the target topology and determine whether the intermediate topology meets the capacity requirement placed on the network. If the intermediate topology meets the capacity requirement, the intermediate topology is accepted. The computing device then iteratively can generate additional intermediate topologies until the topology converges to the starting topology while ensuring that each additional intermediate topology meets the capacity requirement. As such, when there is convergence the computing device has a sequence of intermediate topologies that link the target topology to the starting topology. These intermediate topologies may then be the basis of deliverables or tasks that are carried out to implement the target topology. Each intermediate topology can be simulated by a network simulation to ensure that despite errors or variances in the network capacity, the intermediate topology meets the capacity requirements.

Example Methods and Systems

A network can be made up of a number of datacenters which are interconnected. Each datacenter can contain its own network. A datacenter network can be made of points of delivery (Pods or PODs). A POD is a module of network, computational, storage, and other application components which work together to deliver network related services. PODs can be repeated in design to allow for the PODs within a network to be scalable, modular, and more manageable. When interconnected, PODs can form a data center network.

In some examples, PODs are interconnected by patch panels. A patch panel is also known as a path bay, patch field, or jack field. A patch panel is a piece of hardware that contains a set number of ports to connect and manage the incoming and outgoing wires or cables. A wire or wires between a first POD to a patch panel, and from that patch panel to a second POD allow for interconnection of the first POD and the second POD. The interconnections between the PODs form a physical topology. The physical topology refers to the physical links connecting PODs with patch panels. A logical topology is a set of logical links which connect a port in the patch panel to another port in the same patch panel. A logical topology over all patch panels can be thought of as a functional "system level" view of the data center as a whole.

A network made up of a number of datacenters can also have a physical topology and a logical topology. In a high level or simplified view, the physical topology or logical topology can consist of viewing each datacenter as a point or node within the topology. In a more granular view, each physical or logical link within the larger network, such as those between PODs, can all be viewed as part of the topology.

Figure 1A:
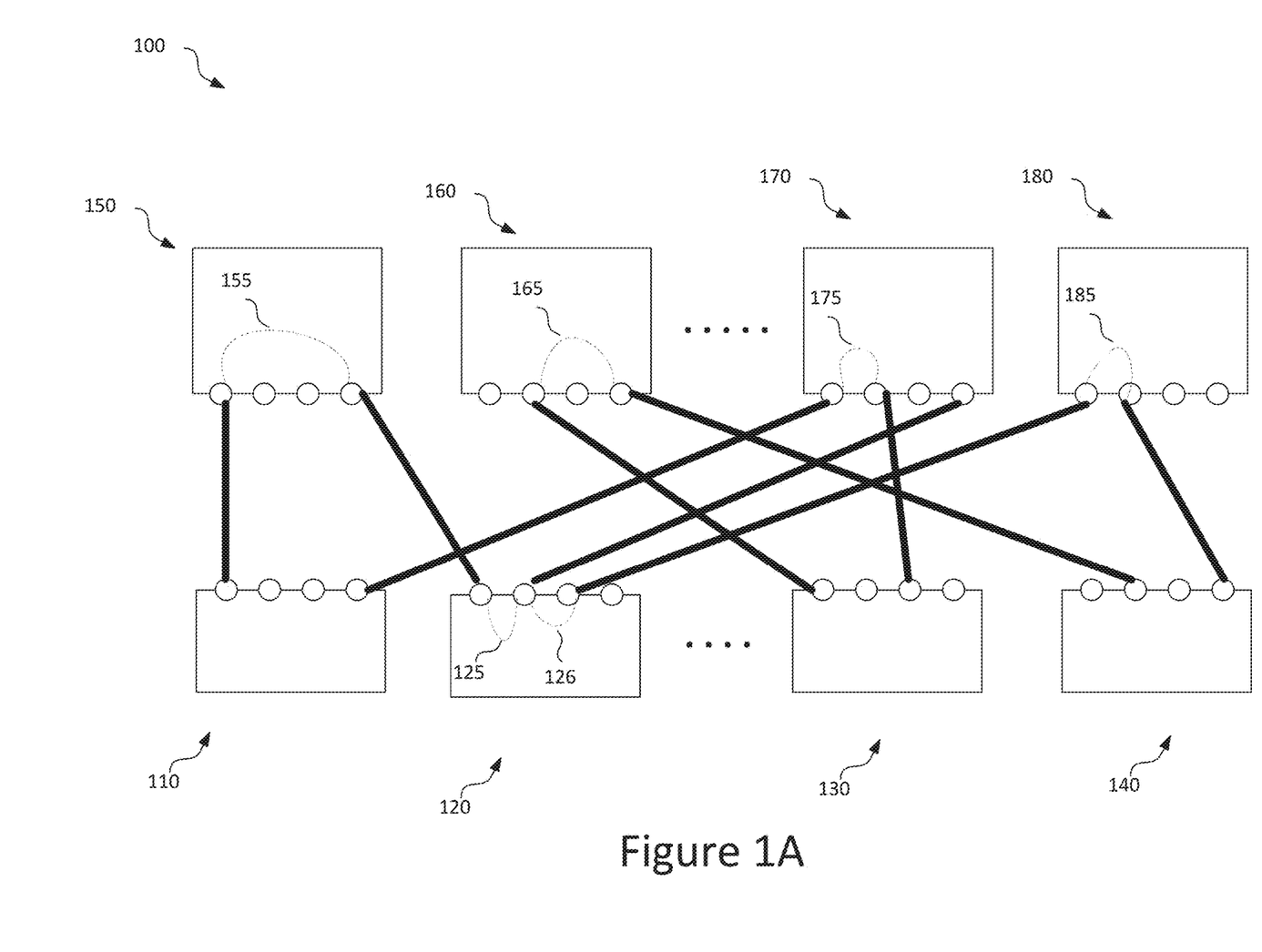
FIG. 1A illustrates a block diagram of an example physical topology of a network according to aspects of the disclosed technology.

FIG. 1A illustrates an example physical topology of an example network 100. Network 100 can consist of a number of nodes 110, 120, 130, 140, 150, 160, 170, and 180. In some examples, each node can be a datacenter, which may be located at different locations, such as different cities. In other examples, each node can be a repeater or physical link to connect aspects of the datacenter.

Each node may have certain characteristics, such as overall capacity, throughput, number of active connections, or input and output ports which are illustrated by circles on each node in FIG. 1A. Each node may have internal links or connections between input and output ports, such as links 125, 126, 155, 165, 175, and 185 illustrated with dashed lines. As can be appreciated from FIG. 1A, changes or upgrades to any aspect of the nodes can affect the connectivity between other nodes. For example, an upgrade or change to link 185 within node 180 would affect connectivity between node 140 and 110.

Figure 1B:
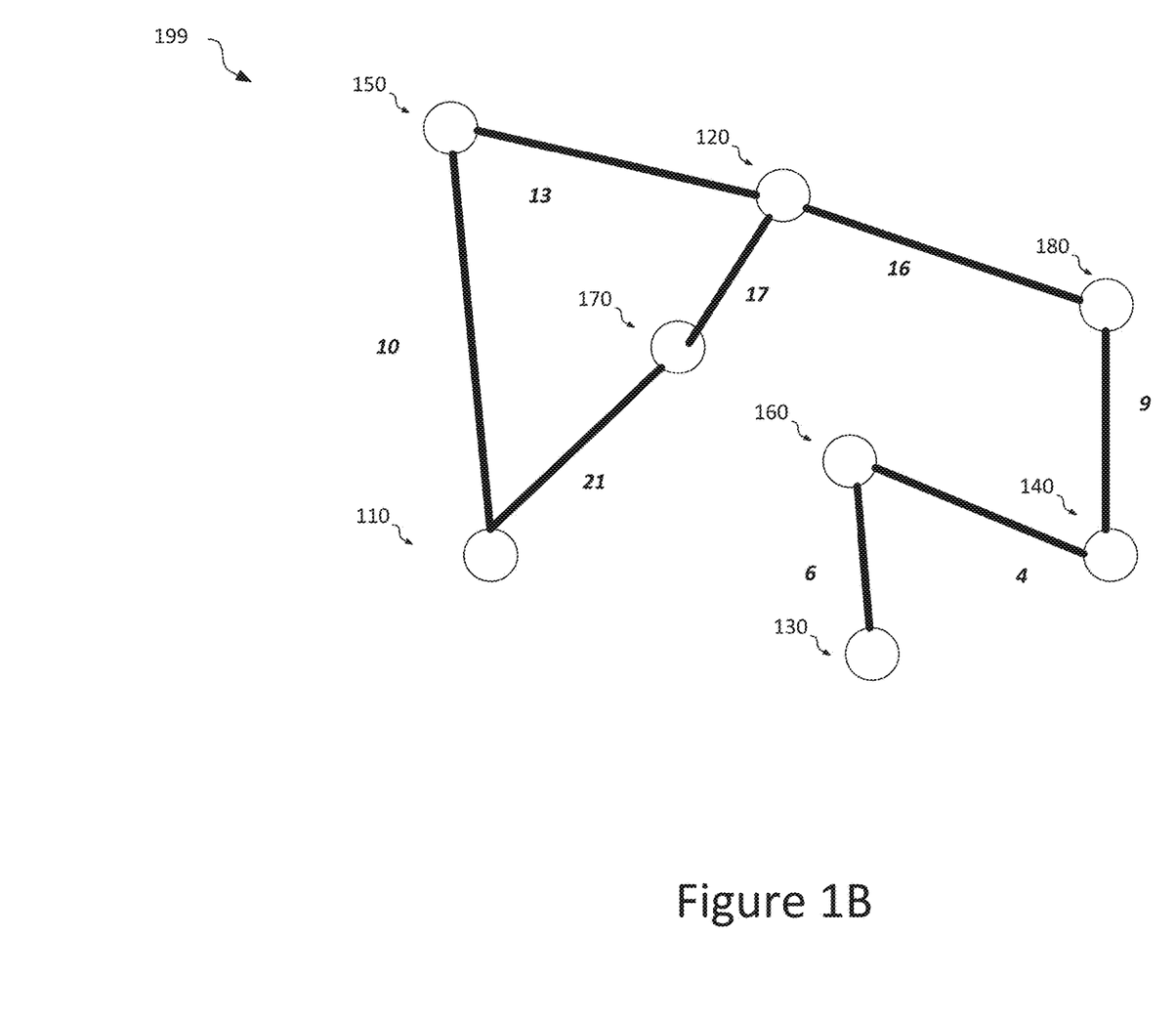
FIG. 1B illustrates a block diagram of an example logical topology implemented on the physical topology of the network illustrated in FIG. 1A according to aspects of the disclosed technology.

FIG. 1B illustrates an equivalent logical topology of example network 100, topology 199. FIG. 1B is a "logical" level view of interconnections between nodes without the specific physical connections enabling those nodes to interconnect with one another. Also illustrated in FIG. 1B is a capacity between two nodes. In some examples, the capacity can be the number of active connections between the nodes. In some examples, the capacity can be the maximum throughput between the two nodes in the network.

As explained further herein, a network may have a current topology and a target topology. The target topology can be achieved through physical (e.g., change wiring or cabling) or software changes (e.g., change routing) to equipment comprising the network. Each stage within a sequence of upgrades from the current topology to the target topology can have a physical and/or corresponding logical topology which sequentially updates the network from the current topology to the target topology. In some examples, each stage can be associated with a period of time or milestone. In other examples, a stage can be associated with an arbitrary event.

Figure 2:
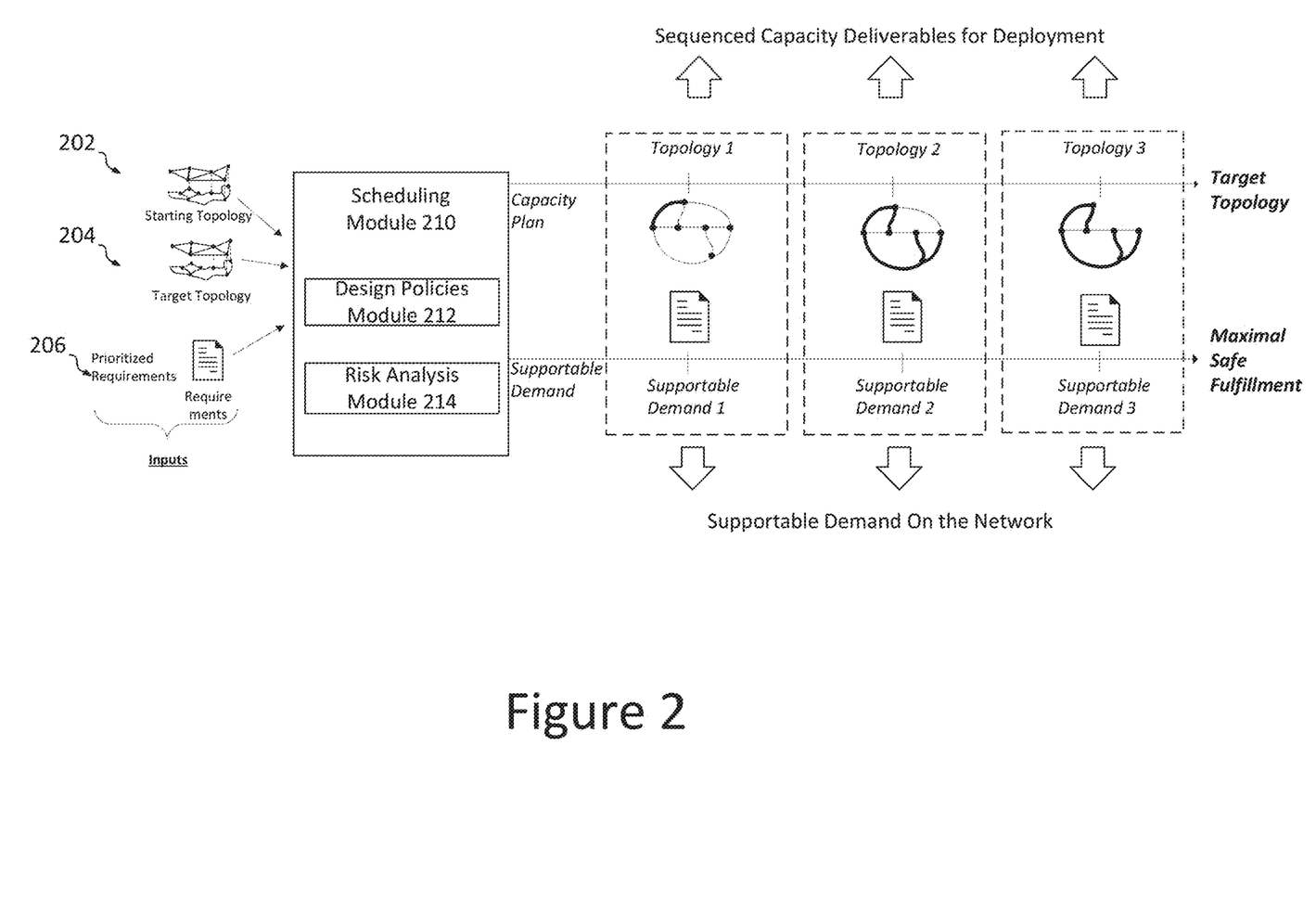
FIG. 2 illustrates aspects of an example architecture according to aspects of the disclosed technology.

FIG. 2 illustrates an example of an architecture of a tool in accordance with an aspect of the disclosed technology. The tool may be considered an optimization tool. As a practical matter, it may be considered a sequencing tool that provides as an output a sequence of network topologies that allows a network operator to migrate from a current network topology to a desired or target network topology, while meeting capacity and continuity requirements and other restraints necessary to operating a network, e.g., meeting service level agreement requirements. Illustrated in FIG. 2 is a scheduling module 210, design policies module 212, and risk analysis module 214. Scheduling module 210 can take as inputs starting topology 202, target topology 204, and information related to demands or requirements of on the network, requirements 206. In some examples, a module can be for example, a set of instructions, software, or software components, that may cause a processor to perform certain processes, tasks, or functions, such as for example the processes identified herein for the respective modules.

Starting topology 202 can be the starting or current topology of a network, such as network 100 and target topology 204 can be a desired topology of a network, such as network 100. In this regard, network 100 is provided as an example of a type of starting and target network. However, in a typical application the starting and target networks will have different topologies and are not limited to networks formed within a datacenter but may also comprise networks formed via interconnection of different datacenters. In addition, in some examples, starting topology 202 and target topology 204 can be described in a computer readable or binary format. The topology is a cross layer topology, which can be both a combination of a physical and logical links, in addition to the associated nodes and links.

Requirements 206 can contain information which includes service level objectives (SLOs) for the network at various points of time or stages. Aside from SLOs, other demand input which may be relevant is prioritization. For example, a "phased/prioritized" demand input may be provided, such that higher-priority flows are supported before lower priority flows. This may be provided in parallel to SLOs. So for a particular priority, the flows are admitted based on their SLO. As further explained herein, this flow can be included when determining the sequence of network upgrades. In some examples, requirements or demands can be used interchangeably in this disclosure to describe the demand or requirement placed on the network at various points of time or stages.

Scheduling module 210 can contain software components capable of outputting a sequence of stages, each stage containing a topology and a capacity or level of supportable demand for a network at that stage for the given topology. In some examples, the number of stages can be provided by a user or gleaned from a list of requirements 206 while in other examples the number of stages or sub-stages can be generated or suggested through an algorithm, such as for example, a deterministic, non-deterministic, or machine-learning algorithm. Scheduling module 210 can conduct optimization using mathematical optimization algorithms, which can include optimizing the sequence of deliverables such that the requirements or demands fit or are constrained to each topology at each stage. Scheduling module 210 can achieve the sequential stages through using any of the methods or mathematical equivalents described herein. Scheduling module 210 can also parse the list of requirements from requirements 206.

Design policies module 212 can be capable of providing instructions related to each topology within a sequence of upgrades. In some examples, design policies module 212 can provide instructions related to topology changes which must occur within a physical layer or physical topology. In some examples, the design policies module can indicate broad level changes, such as an overall change within a particular datacenter or between datacenters. In other examples, the design policies module 212 can provide granular information related to upgrades to links, physical rewiring, patch panels, reprogramming of controllers, installation of additional modules or wiring, or other network components. In other examples, design policies module 212 can contain a set of constraints which prohibit or restrict particular changes to the network to be made by Scheduling module 210. For instance, a particular set of physical changes may not be permissible within a network due to business or other reasons, and can be represented or contained within design policies module 212. Design policies module 212 can also include or implement any organizational design policies enforced by an organization. For instance, particular types of data flows can be treated in a particular manner. In another example, design policies module 212 can require that under a particular data failure scenario, a certain level of protection to the network capacity is provided. Design policies module 212 can contain a set of rules that a network design is required to follow.

Risk analysis module 214 can describe or quantify a particular level of risk related to a set of service level objectives, such as likelihood of outage of the network, latency, delivery, availability of the network, and business continuity. In some examples, risk analysis module 214 can be a specialized tool or software component related to the network which can simulate random perturbations or other outages in the network to ensure that the risk levels related to the network are within a specified range. In other examples, risk analysis module 214 can simulate the behavior of a traffic engineering algorithm that routes traffic on a network. Risk analysis module 214 can ensure that for any given topology, the set of service level objectives are met.

A series of stages can be generated from Scheduling module 210, such as stage 1, stage 2, stage 3, and so on until the target topology is achieved. Each stage can have a topology for that particular stage, which is part of the continuum of upgrades which sequentially converge the topologies to target topology 204. Each topology within a stage can have associated with it a set of capacity deliverables for deployment to create the topology from a prior topology, including both physical layer and logical layer level changes.

Figure 3:
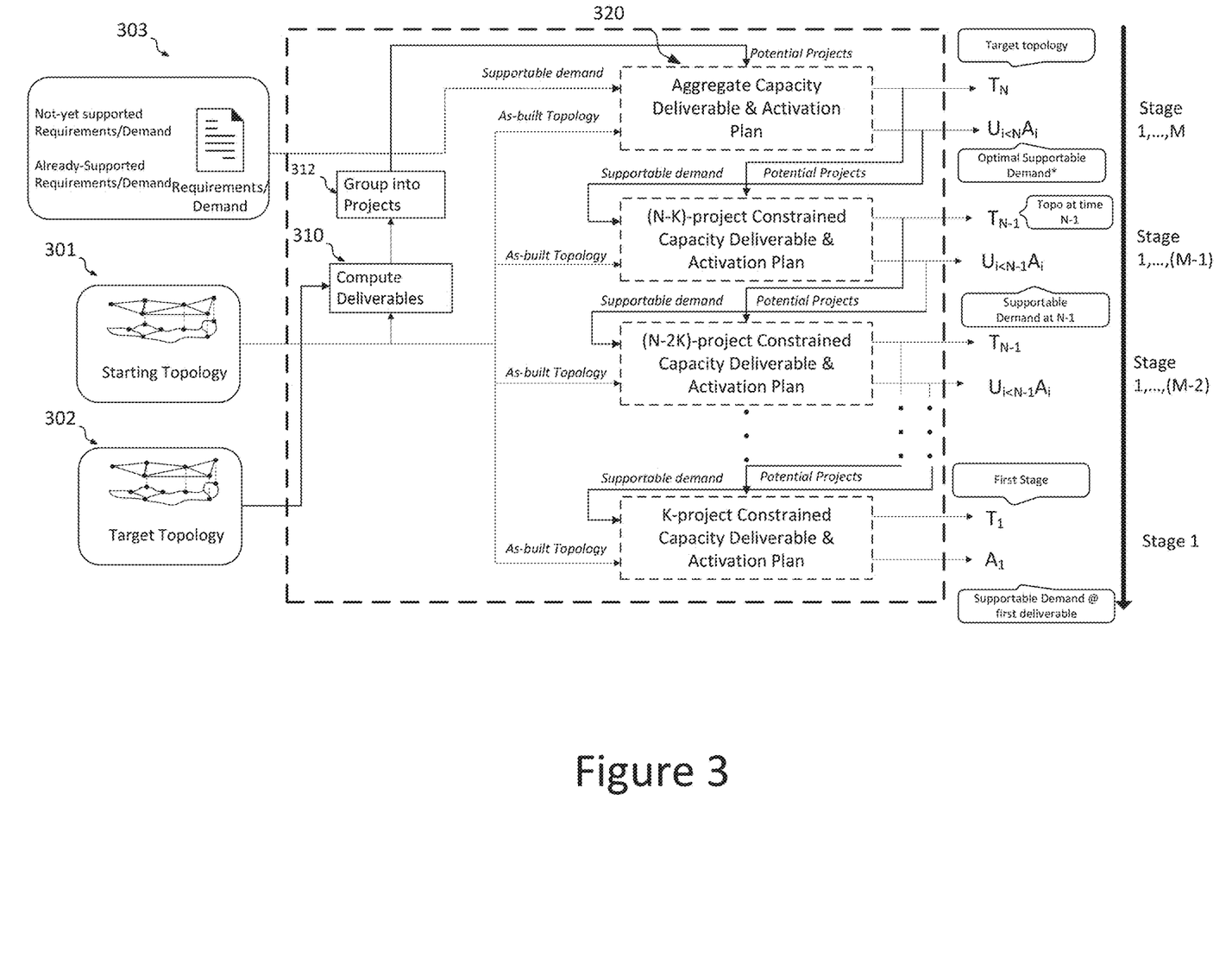
FIG. 3 illustrates aspects of an example schematic diagram according to aspects of the disclosed technology.

FIG. 3 illustrates a schematic view of inputs used at various stages to produce a sequence of stages. The number of stages can be represented as "N" discrete stages. As used in FIG. 3, $T_i$ can represent the topology of the network at a given time or stage i. For example, with N stages, the topology of the network can be represented as one of $T_N$, $T_{N-1}$, $T_{N-2}$ . . . $T_1$. In some examples, $T_N$ can represent the final or target topology while $T_1$ can represent the starting topology of the network. The usable capacity or activatable capacity of the network at a given stage "i" can be represented by $A_i$. In some examples, $A_i$ can represent the activatable demand which can be added or increased at a particular stage. U, can represent the mathematical union operator for a particular i, and $U_{i<k}$ can represent the union over a particular index, such as a union over all elements less than k. $U_{i<k} A_i$ can represent the union of all activatable capacity or planned usage of the network. As illustrated in FIG. 3, processing starts with target topology $T_N$ and working in reverse determines the stages through to stage $T_1$.

In some examples, constraints can be placed on $A_i$ such that $A_{k-1} <= A_k$ for all values of k—however, in other examples, the constraint on $A_i$ need not be placed. In addition, additional constraints can be placed on requirements for A, which can be derived from the requirements 303, explained further below. In addition, end point conditions can be placed such that $A_N$=Planned Usage/Planned Traffic of the Network. In some examples, $A_N < T_N$ and $U_{i<k} A_i < T_N$.

FIG. 3 illustrates a set of requirements, requirements 303. Each requirement within requirements 303 can correspond to a required or desired network characteristic. Each requirement can also have a temporal aspect, such as when the requirement must be met. FIG. 3 also illustrates a starting topology 301 and a target topology 302. The target topology 302 can be analyzed to compute deliverables, such as at block 310. In some examples, a deliverable can be a change or a set of changes to the physical or logical topology. A deliverable may also include granular instructions or be translated into equipment specific instructions or tasks. For example, a deliverable may be to change a particular node, remove certain equipment, to change or add other equipment, or make changes to the configuration of software or hardware of equipment. At block 312, the computed deliverables can be grouped in projects to be performed. In some examples, each deliverable can be a project. In other examples, each deliverable is related to a node to a particular project. In yet other examples, deliverables can be grouped by time, location, or steps to create a project. In yet other examples, a project can be a combination of deliverables based on user preferences, user inputs, or user requirements.

At block 320, the capacity deliverables for the project as well as the activation plan can be aggregated. The activation plan can consist of a sequence of flows which can be supported; or stated alternatively, the amount of active or usable capacity of the network at each stage. At block 320, using for example Scheduling module 210, design policies module 212, and risk analysis module 214, potential projects, such as a set of potential upgrades or changes to the network, and supportable demand or supportable requirement for the network can be generated. The set of potential upgrades can be determined based on the physical hardware changes involved, decommissioning of equipment, or the requirements for supportable demand. In other examples, the set of changes, upgrades, or decommissions can be determined as a difference between a starting topology and a target topology.

The selected projects for stage N are used as inputs to stage N−1 to choose a subset of projects. At each stage, a project chosen can be determined based on the requirement from requirements 303 corresponding to that stage. This process can continue step-wise until the first stage or starting topology is reached.

Figure 4:
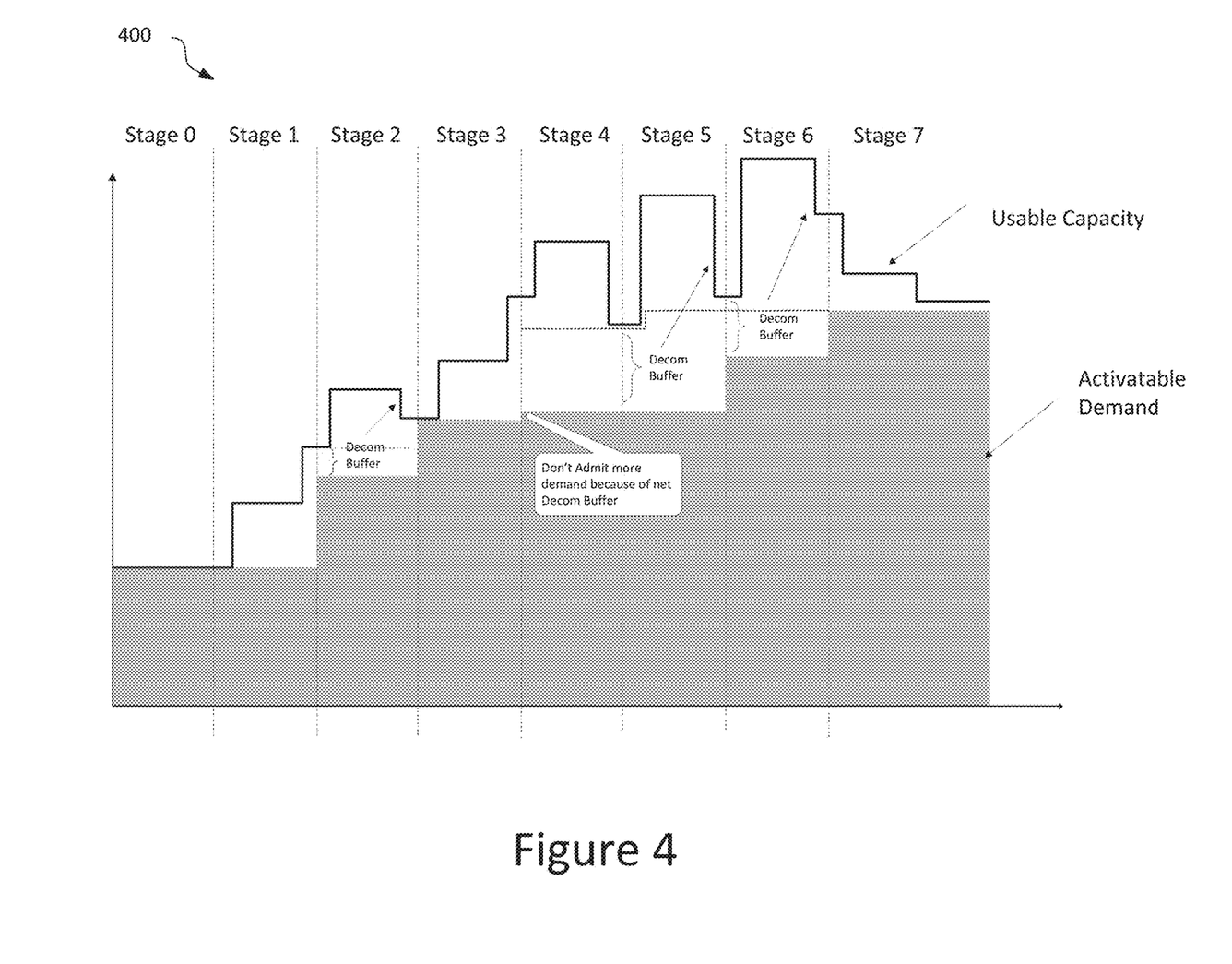
FIG. 4 illustrates aspects of an example graph according to aspects of the disclosed technology.

FIG. 4 illustrates a graph of the usable capacity and activatable demand or capacity at various stages, graph 400. In some examples, these stages can correspond to the stages generated from Scheduling module 210. The vertical axis of graph 400 represents the capacity of a network while the horizontal axis represents the various stages of upgrades that the network undergoes. On graph 400, the solid line can represent the capacity of the network at a particular stage while shaded region can represent the available throughput or activatable flow. At each stage, a usable capacity for the network can be calculated based on the topology of the network at that stage. In some examples, the topology at any particular stage can be output by Scheduling module 210. The use of network tools can provide the usable capacity for the network at that time as well as other performance metrics. Also illustrated in FIG. 4 is a "decommission" buffer between the usable capacity as well as the activable demand/usable capacity at any given stage. The buffer can be set or calculated based on service level objectives or other parameters, and ensure that the usable capacity never violates In other examples, this buffer can be based on certain links, capacities, or nodes, or other equipment being decommissioned at certain points, such as device end of life, migration to new physical components, re-use of existing resources by another link. The decommission buffer can be used to ensure that even if planned decommissions happen as the next change to the network, the impact will never sacrifice the SLO of the currently supported traffic.

Figure 5:
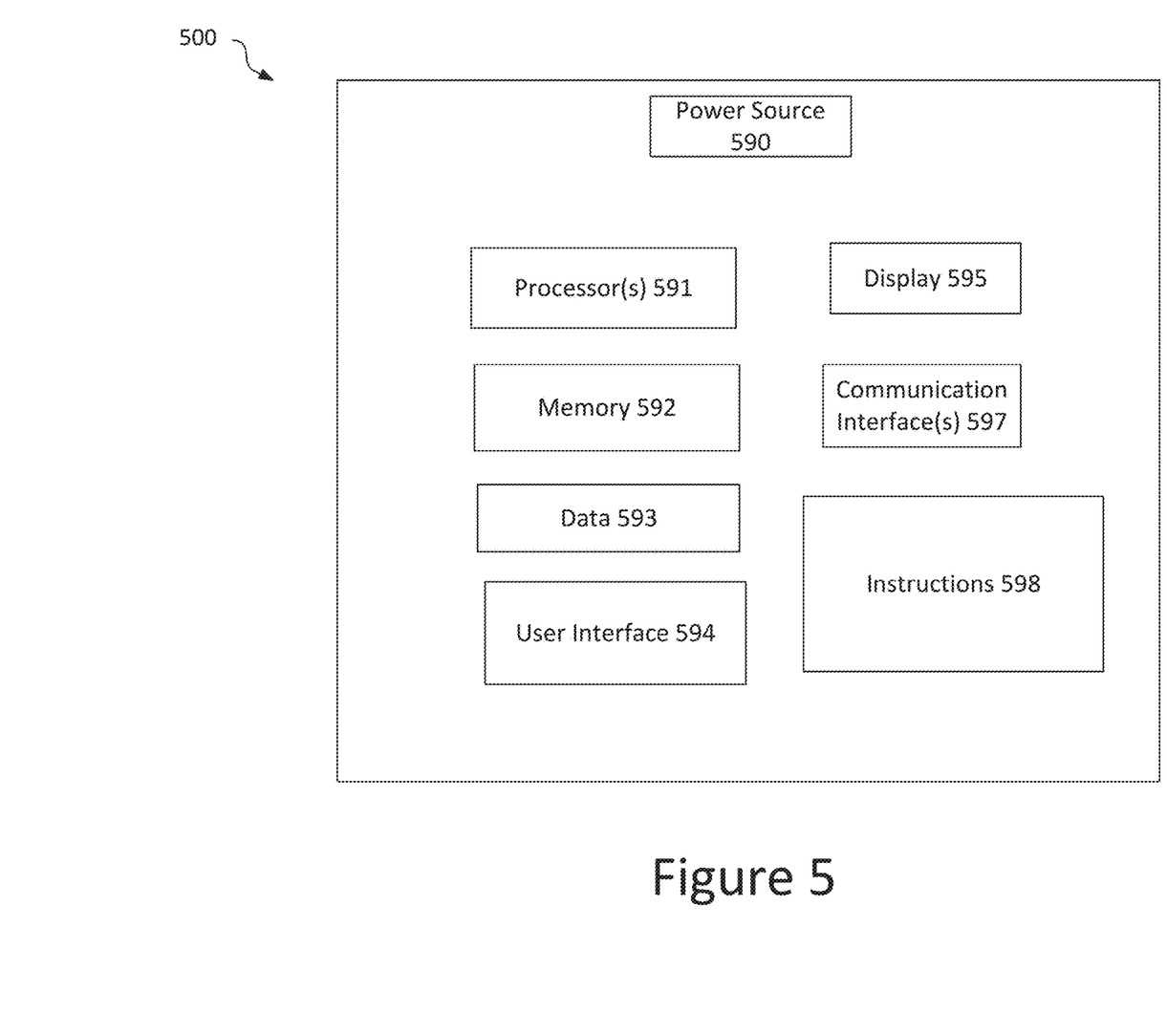
FIG. 5 illustrates aspects of an example computing system according to aspects of the disclosed technology.

FIG. 5 illustrates an example computing device according to aspects of the disclosed technology. FIG. 5 illustrates aspects of a device 500. In some examples, device 500 can be a tablet, a smartphone, a smart watch, a laptop, a desktop, or a server. Device 500 may contain a power source 590, processor(s) 591, memory 592, data 593, a user interface 594, a display 595, communication interface(s) 597, and instructions 598. The power source may be any suitable power source to generate electricity, such as a battery, a chemical cell, a capacitor, a solar panel, or an inductive charger. Processor(s) 591 may be any conventional processor, such as commercially available microprocessors or application-specific integrated circuits (ASICs); memory, which may store information that is accessible by the processors including instructions that may be executed by the processors, and data. Memory 592 may be of a type of memory operative to store information accessible by the processors, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions and data are stored on different types of media. Data 593 of device 500 may be retrieved, stored or modified by the processors in accordance with the instructions 598. For instance, although the present disclosure is not limited by a particular data structure, data 593 may be stored in computer registers, in a relational database as a table having a plurality of different fields and records, XML documents, or flat files. Data 593 may also be formatted in a computer-readable format such as, but not limited to, binary values, ASCII or Unicode. Moreover, data 593 may comprise information sufficient to identify the relevant information, such as numbers, descriptive text, proprietary codes, pointers, references to data stored in other memories—including other network locations, or information that is used by a function to calculate the relevant data.

Instructions 598 may control various components and functions of device 500. For example, instructions 598 may be executed to perform any of the methods indicated in this disclosure. In some examples, algorithms can be included as a subset of or otherwise as part of instructions 598 included in device 500. Instructions 598 can include algorithms to execute any of the methods or a subset of the methods described within this disclosure.

User interface 594 may be a screen which allows a user to interact with device 500, such as a touch screen or buttons. Display 595 can be an LCD, LED, mobile phone display, electronic ink, or other display to display information about device 500. User interface 594 can allow for both input from a user and output to a user. Communication interface(s) 597 can include hardware and software to enable communication of data over standards such as Wi-Fi, Bluetooth, infrared, radio-wave, and/or other analog and digital communication standards. Communication interface(s) 597 allow for device 500 to be updated and information generated by device 500 to be shared to other devices. In some examples, communication interface(s) 597 can send information stored in memory 592 to another user device for display, storage, or further analysis.

Figure 6:
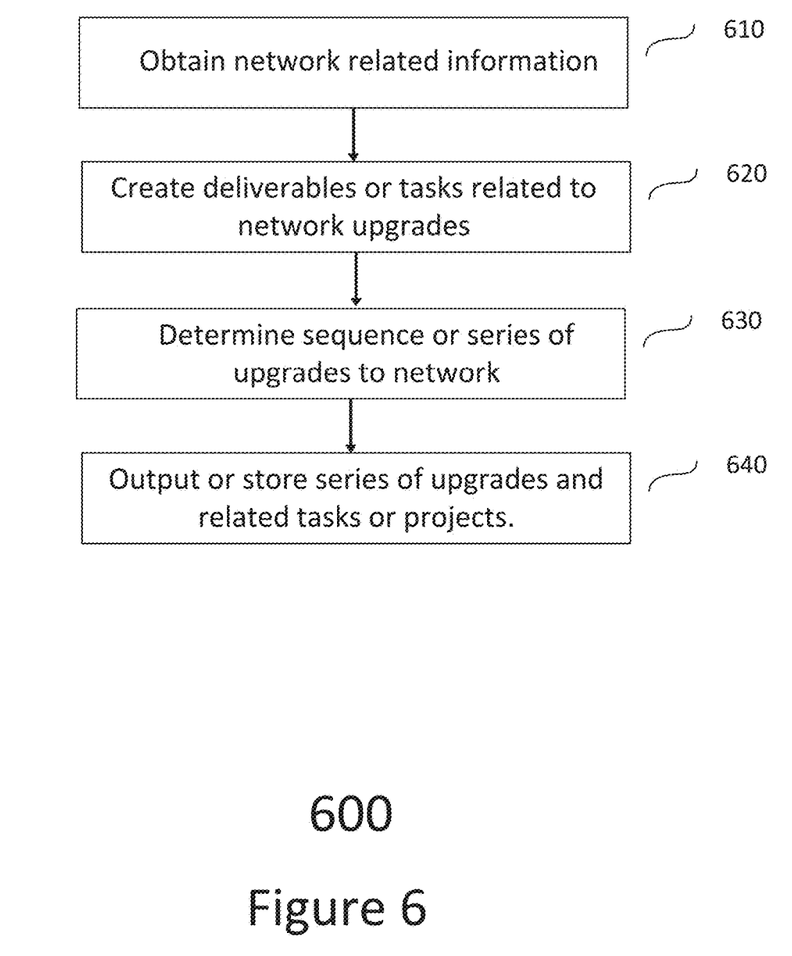
FIG. 6 illustrates an example method according to aspects of the disclosed technology.

FIG. 6 illustrates an example method 600 according to aspects of the disclosed technology. In some examples, method 600 can be used to generate a series of stages and an associated set of deliverables and associated with the network.

At step 610, information related to the network can be obtained. For example, at step 610, a starting topology, such as topology 301, and a target topology, such as topology 302, can be obtained. Other information related to the network such as requirements or demands, as described in the above examples, can also be obtained at this stage.

At step 620, information relating to deliverables or projects can be computed from information related to the network. For example, at step 620 deliverables or projects related to the entire network upgrade can be obtained. For example, a series of deliverables or projects to create the target topology from the starting topology can be obtained. A deliverable or projects may comprise instructions specifying a given change or series of changes to make to a network topology and the order in which the changes must be made. The deliverables can be grouped into particular projects or sub-tasks at step 620 or another step.

At step 630, a series or sequence of upgrades to the network can be determined. In some examples, a multiple mixed-integer linear programming formulation or approach can be used in determining the sequence of upgrades. In some examples, "N" determinations or mathematical problems can be solved to generate a sequence of upgrades in "N" stages. The use of "N" determinations is computationally more efficient than solving a global problem of finding the most efficient pathway or sequence of upgrades while meeting the constraints or requirements placed on the network at "N" stages. The result from a level "above" can be used as the constraints for a level below.

In some examples, an objective function can be used as a part of the determination, e.g., maximization or minimization of a particular network requirement can be performed.

In some examples, a determination can be made by, e.g., maximization of already-activated requirements admission, maximization of requirements designed to be activated or supported by that point, or maximization of future requirements, subject to meeting prior or past-due requirement quotas and already activated requirement quotas. The object function can be subject to a number of constraints or requirements. The constraints can include for example, a limit of "K" projects or changes to the topology in each stage and requiring that the activatable or usable capacity of the network meets the requirement for that stage and fits within the topology of that particular stage. Other constraints can include the type of projects or changes that can be made to the network at a particular stage. The constraints can also include that the activatable or usable capacity in each stage fits in every subsequent stage, and that the activatable or usable capacity is still met if all "negative" capacity projects (such as for example, decommissioning of equipment) occur before the "positive" capacity project for that stage (e.g., commissioning of new equipment).

In some examples, the optimization is further constrained in that the combined set of changes made to the topology (as represented by the projected or tasks) across all stages must be equivalent to the difference between the starting topology and the target topology. Further, between any two stages, the combined set of changes made to the topology must equal the difference in the topology between those two stages. The use of such constraints can ensure that there is continuity between the stages. Other constraints can be placed at each stage and each determination.

Although step 630 is described with respect to a formulation or implementation using integer programming, equivalent or other mathematical techniques can be used. For example, techniques which use as part of their determination an output of the determination for any K+1 stage as an input for determination of a K stage in a series of network upgrades can be used. For example, machine learning techniques can be used at each stage to make determinations subject to the constraints specified, such as for example deep learning, neural nets, generative networks, classification techniques, exhaustive exploration techniques, gradient descent techniques, or genetic algorithms. At step 630, the generated proposed tasks can also be simulated to ensure that they meet service level, margin, and other requirements.

At step 640, a series or sequence of upgrades or deliverables can be outputted or stored. For example, the series of upgrades can also include information with related tasks or projects at each stage of the upgrades. At step 640, each deliverable can be implemented at every stage in the upgrade process. In some examples, if a particular deliverable cannot be implemented (e.g., a particular physical or logical topology is no longer feasible) this information can be provided and a new deliverable can be calculated.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Aspects of the disclosed technology can include any combination of the following features:

Feature 1. A method of upgrading a network, the method comprising:
  obtaining a starting topology and a target topology;
  obtaining a set of data related to performance requirements for the network;
  calculating, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements for the network specified by the set of data; and
  determining a usable capacity for each intermediate topology.

Feature 2. The method of feature 1 comprising outputting the usable capacity determined for each intermediate topology.

Feature 3. The method of features 1-2 further comprising simulating each intermediate topology to ensure that the network meets a risk level related to the network.

Feature 4. The method of features 1-3 wherein each intermediate topology is a logical topology.

Feature 5. The method of features 1-4 further comprising generating deliverables required to achieve each intermediate topology.

Feature 6. The method of feature 5 wherein the deliverables include a physical topology or a set of changes to a physical topology for each intermediate topology.

Feature 7. The method of features 1-6 wherein each deliverable comprises a modification to a physical component of the physical topology of the network.

Feature 8. A system comprising:
  one or more processing devices coupled to a memory containing instructions, the instructions causing the one or more processing devices to:
    obtain a starting topology and a target topology;
    obtain a set of data related to performance requirements for the network;
    calculate, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements for the network specified by the set of data;
    determine a usable capacity for each intermediate topology; and
    display or output information associated with the calculated finite sequence.

Feature 9. The system of feature 8, wherein the instructions cause outputting the usable capacity determined for each intermediate topology.

Feature 10. The system of features 8-9 wherein the usable capacity is a strictly increasing function.

Feature 11. The system of features 8-10 wherein each intermediate topology is a logical topology.

Feature 12. The system of features 8-11 wherein the instructions cause generating deliverables required to achieve each intermediate topology.

Feature 13. The system of features 9-12 wherein the deliverables include a physical topology or a set of changes to a physical topology for each intermediate topology.

Feature 14. The system of features 9-13 wherein each deliverable comprises a modification to a physical component of the physical topology of the network.

Feature 15. A non-transient computer readable medium containing program instructions, the instructions when executed perform the steps of:
  obtaining a starting topology and a target topology;
  obtaining a set of data related to performance requirements for the network;
  calculating, iteratively, a finite sequence from the target topology to the starting topology, wherein each element of the finite sequence comprises an intermediate topology, and a first element of the finite sequence is the target topology and a last element of the finite sequence is the starting topology, and each element of the finite sequence meets the set of data related to performance requirements for the network specified by the set of data; and
  determining a usable capacity for each intermediate topology.

Feature 16. The non-transient computer readable medium of feature 15 wherein a usable capacity is output for each intermediate topology.

Feature 17. The non-transient computer readable medium of features 15-16 wherein the usable capacity is a strictly increasing function.

Feature 18. The non-transient computer readable medium of features 15-17 wherein each intermediate topology is a logical topology.

Feature 19. The non-transient computer readable medium of features 15-18 further comprising generating deliverables required to achieve each intermediate topology.

Feature 20. The non-transient computer readable medium of features 1-19 wherein the deliverables include a physical topology or a set of changes to a physical topology for each intermediate topology.

The invention claimed is:
1. A method of upgrading a network, the method comprising:
  obtaining a starting topology and a target topology;
  obtaining a set of data related to performance requirements for the network;

calculating, iteratively, a finite sequence from the target topology to the starting topology, wherein a first element of the finite sequence comprises the target topology, a last element of the finite sequence comprises the starting topology, and one or more other elements of the finite sequence each comprises an intermediate topology, and wherein each element of the finite sequence meets the set of data related to performance requirements for the network specified by the set of data;

determining a usable capacity for each intermediate topology; and displaying or outputting information associated with the calculated finite sequence.

2. The method of claim 1, comprising outputting the usable capacity determined for each intermediate topology.

3. The method of claim 2 further comprising simulating each intermediate topology to ensure that the network meets a risk level related to the network.

4. The method of claim 1 wherein each intermediate topology is a logical topology.

5. The method of claim 1 further comprising generating deliverables required to achieve each intermediate topology.

6. The method of claim 5 wherein the deliverables include a physical topology or a set of changes to a physical topology for each intermediate topology.

7. The method of claim 5 wherein each deliverable comprises a modification to a physical component of the physical topology of the network.

8. A system comprising:
one or more processing devices coupled to a memory containing instructions, the instructions causing the one or more processing devices to:
obtain a starting topology and a target topology;
obtain a set of data related to performance requirements for the network;
calculate, iteratively, a finite sequence from the target topology to the starting topology, wherein a first element of the finite sequence comprises the target topology, a last element of the finite sequence comprises the starting topology, and one or more other elements of the finite sequence each comprises an intermediate topology, and wherein each element of the finite sequence meets the set of data related to performance requirements for the network specified by the set of data;
determine a usable capacity for each intermediate topology; and
display or output information associated with the calculated finite sequence.

9. The system of claim 8, wherein the instructions cause outputting the usable capacity determined for each intermediate topology.

10. The system of claim 9 wherein the usable capacity is a strictly increasing function.

11. The system of claim 8 wherein each intermediate topology is a logical topology.

12. The system of claim 8 wherein the instructions cause generating deliverables required to achieve each intermediate topology.

13. The system of claim 12 wherein the deliverables include a physical topology or a set of changes to a physical topology for each intermediate topology.

14. The system of claim 12 wherein each deliverable comprises a modification to a physical component of the physical topology of the network.

15. A non-transient computer readable medium containing program instructions, the instructions when executed perform the steps of:
obtaining a starting topology and a target topology;
obtaining a set of data related to performance requirements for the network;
calculating, iteratively, a finite sequence from the target topology to the starting topology, wherein a first element of the finite sequence comprises the target topology, a last element of the finite sequence comprises the starting topology, and one or more other elements of the finite sequence each comprises an intermediate topology, and wherein each element of the finite sequence meets the set of data related to performance requirements for the network specified by the set of data;
determining a usable capacity for each intermediate topology; and
displaying or outputting information associated with the calculated finite sequence.

16. The non-transient computer readable medium of claim 15 wherein a usable capacity is output for each intermediate topology.

17. The non-transient computer readable medium of claim 16 wherein the usable capacity is a strictly increasing function.

18. The non-transient computer readable medium of claim 15 wherein each intermediate topology is a logical topology.

19. The non-transient computer readable medium of claim 15 further comprising generating deliverables required to achieve each intermediate topology.

20. The non-transient computer readable medium of claim 19 wherein the deliverables include a physical topology or a set of changes to a physical topology for each intermediate topology.

* * * * *